April 8, 1924.
G. C. SHERRIN
1,489,463
DEVICE OPERATED BY VARIATIONS IN AIR DENSITY
Filed March 9, 1920   3 Sheets-Sheet 1
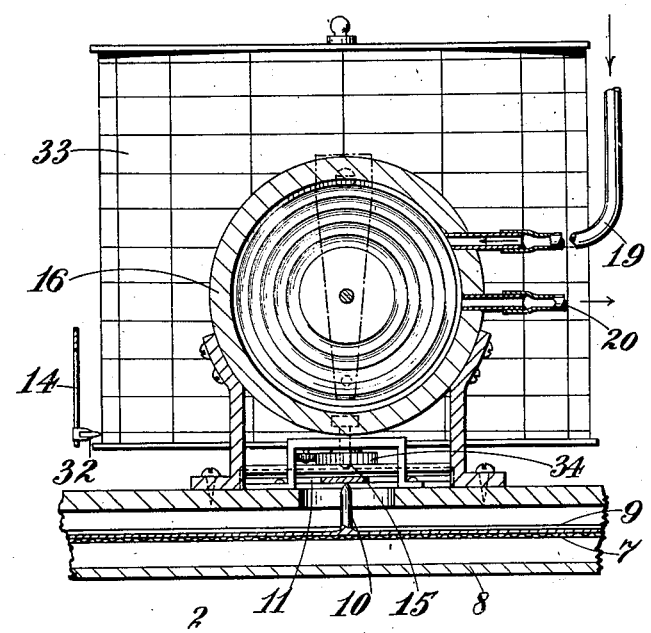
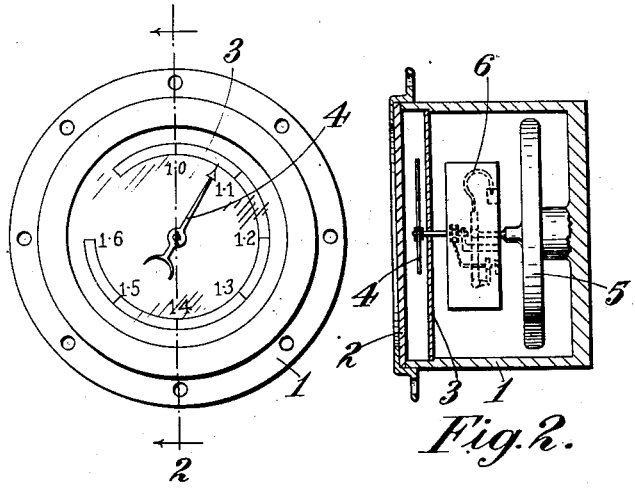

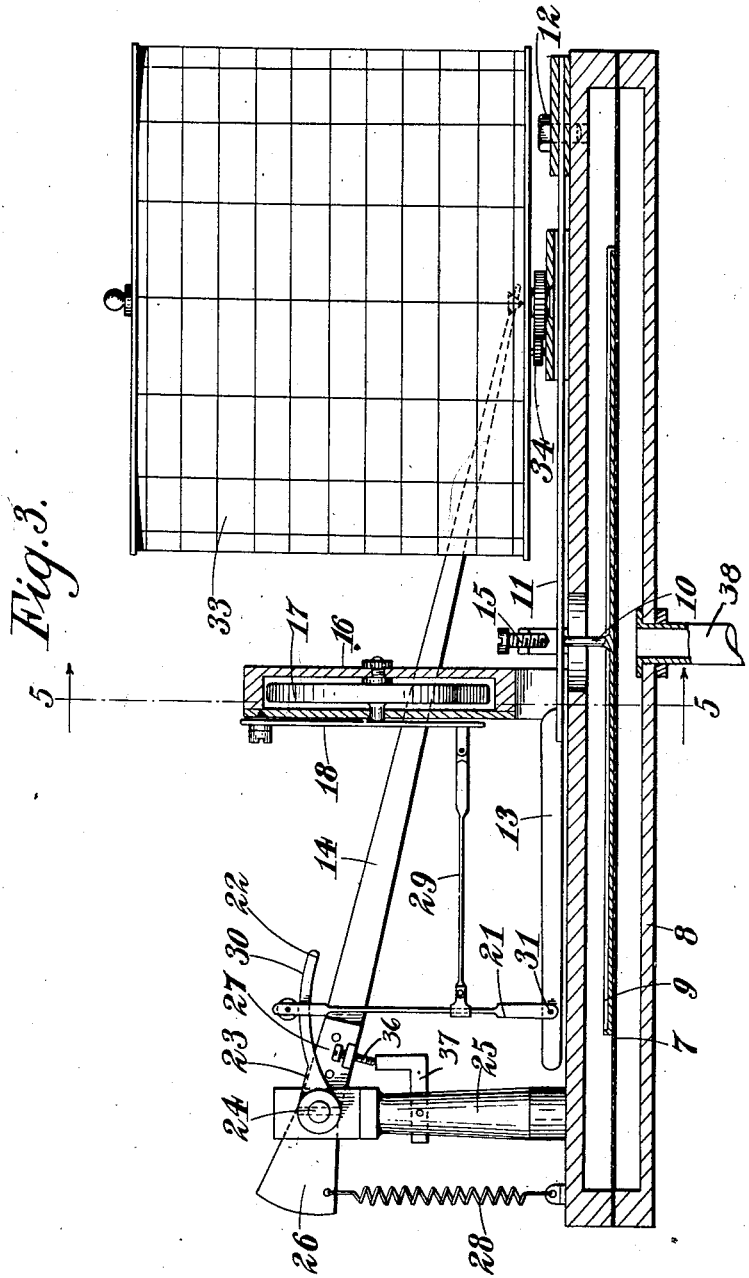

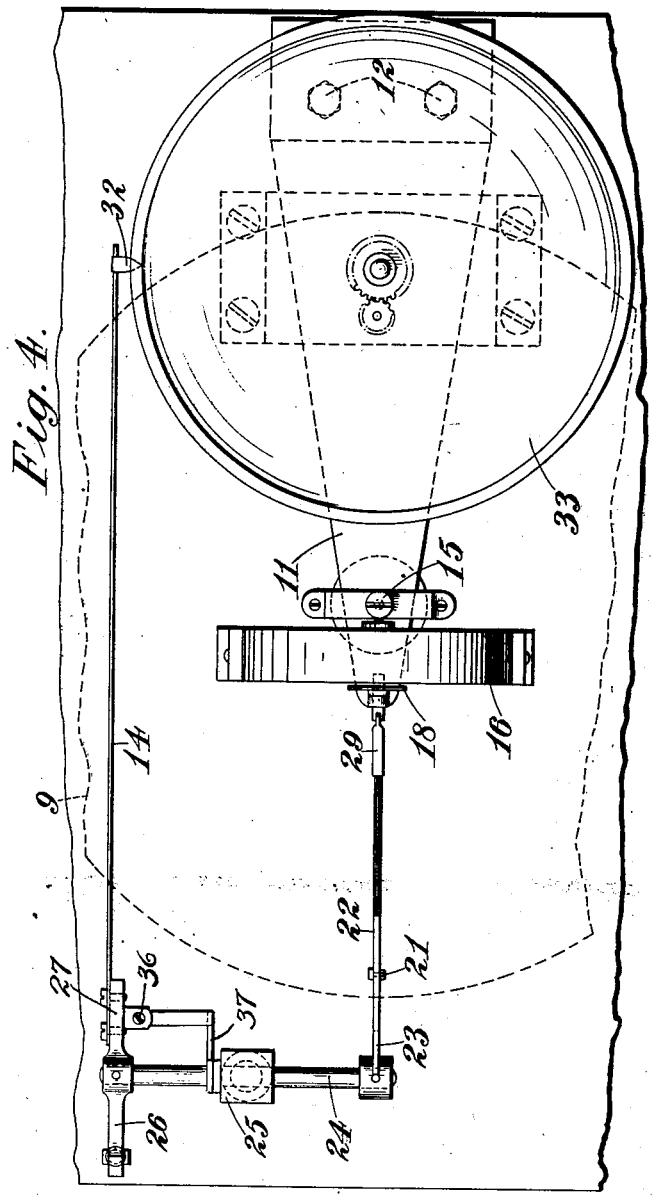

Patented Apr. 8, 1924.

1,489,463

UNITED STATES PATENT OFFICE.

GEORGE CUTHBERT SHERRIN, OF INGATESTONE, ENGLAND, ASSIGNOR TO S. SMITH & SONS (MOTOR ACCESSORIES) LIMITED, OF LONDON, ENGLAND.

DEVICE OPERATED BY VARIATIONS IN AIR DENSITY.

Application filed March 9, 1920. Serial No. 364,444.

*To all whom it may concern:*

Be it known that I, GEORGE CUTHBERT SHERRIN, a subject of the King of England, residing at Ingatestone, in Essex, England, have invented certain new and useful Improvements in Devices Operated by Variations in Air Density, of which the following is a specification.

This invention relates broadly to devices operated by variations in air density, and more particularly to devices of this character for use with air-speed indicators or recorders.

Air-speed indicators of the Pitot tube type as at present employed, for example, by aviators are actuated by the difference of air pressures communicated to opposite sides of a diaphragm, and as this pressure difference for any given speed varies according to the air-density, the speed recorded is only correct for the density for which the apparatus is calibrated.

In known apparatus for measuring and registering the flow of fluids in pipes, it has heretofore been proposed to use a compensating device for varying the movements of a recording arm actuated in accordance with the difference of pressures existing at the two sides of a diaphragm. In one of these known constructions the mechanism operatively connecting the recording arm with diaphragms for actuating it comprised a pivoted connecting-rod having one end slidable in a curved slot; when this rod was moved by another diaphragm actuated in accordance with the temperature of the fluid under measurement, the leverage of the recording mechanism was varied without effecting the zero reading of the apparatus.

The main object of the present invention is to provide an air-density device which may either be provided with its own scale to indicate changes of air-density, or the moving member of the indicator may be connected to an air-speed indicator so as to correct the same for changes of density.

According to the present invention, an air-density device comprises a resilient chamber (for example a drum similar to the vacuum drum of an aneroid barometer), and magnifying mechanism connected therewith as in a barometer, characterized by the resilient chamber being charged with air to superimpose a temperature correction upon the pressure-indications. These indications, it will be understood, may be either as already stated, in relation to a scale or may be only movements of a member for correcting the readings of an air-speed indicator.

According to another feature of the invention, an air-speed indicator or recorder of the pressure-diaphragm type is corrected for varying degrees of air-density by the interposition of a part controlled by an air-density device as just described between the pressure-diaphragm and the indicating or recording arm operated from the diaphragm in such manner that the expansion or contraction of the resilient chamber adds to or subtracts from the movement of the indicating or recording arm when operated from the pressure-diaphragm.

According to a further feature of the invention the air-density device, operates a member of the magnifying mechanism in such manner as to vary the leverage of the magnifying mechanism without moving the same when it is at zero, but so as to increase or decrease the operative readings according to the changes in air-density.

Conveniently the resilient chamber is surrounded by a casing through which the surrounding air is circulated. In this way it will be kept at the same temperature as such surrounding air.

For a more complete understanding of the invention there will now be described, by way of example only, and with reference to the accompanying drawings, certain constructional forms of apparatus according to the invention. It is to be understood, however, that the invention is not limited to the precise constructional details enumerated.

In the accompanying drawings—

Figure 1 is a front view of an air-density device according to the invention, and Figure 2 is a cross-section on the line 2—2 of Figure 1;

Figure 3 is a side elevation, partly in section, of an air-speed recorder compensated for air density variations, Figure 4 is a plan of the same, and Figure 5 is a cross-section on the line 5—5 of Figure 3.

Like reference numerals indicate like parts throughout the drawings.

Referring firstly to Figures 1 and 2, there is shown therein a casing 1 having a glazed front 2 behind which is a graduated dial 3 co-operating with a rotary pointer 4. Behind the dial 3 the casing 1 contains a resilient chamber 5 in the form of a sealed drum similar to the vacuum drum of an aneroid barometer. This drum is charged with air at a selected density. A suitable magnifying mechanism, diagrammatically illustrated at 6, connects the drum 5 with the pointer 4, such magnifying mechanism being of the spring balance type commonly used in aneroid barometers, and not in itself constituting part of the present invention. The form of the resilient chamber is immaterial, and other well known forms such as a Bourdon tube having sealed ends may be used instead of a drum.

This air-density device is, as already stated, intended to be used in connection with an air-speed indicator or recorder, that is to say with such an indicator or recorder as is not compensated for variations in air-density. If the air-speed indicator or recorder is calibrated to a temperature of 15° C. and the pressure of 760 millimeters, air of this temperature and at half the said pressure will be used to fill the drum 5 before it is sealed. The setting of the various parts of the air-density device will be such that for this air temperature and pressure the pointer will be at 1.0, it being intended that whatever figure is indicated by the pointer should be used to multiply the reading upon the air-speed indicator and thus give the correct air-speed. For example if the air-speeed indicator shows 100 miles per hour as the speed, and the pointer of the air-density device stands at 1.24, the aviator or other person reading the instruments will know that the actual speed is 124 miles per hour.

The air-density device described above provides a means whereby the actual speed may be ascertained but it entails a reading of two instruments and the carrying out of a simple calculation, or in the alternative a reference to a previously calculated table. This may, however, be avoided by interposing the air-density device between the diaphragm of the air-speed indicator or recorder and the indicating or recording arm thereof. This arrangement is illustrated in Figures 3, 4 and 5.

The diaphragm of an air-speed indicator is indicated at 7. It is carried in a casing 8 and is supplied on one side with air by a Pitot tube 38 in the well-known manner. The diaphragm carries a plate 9 with a projection 10 arranged to bear against a control spring 11 secured by screws 12 to the casing 8. The spring 11 carries an extension 13 which reaches towards the magnifying mechanism for operating the indicator or recording arm 14. An adjustable stop 15 is provided to prevent excessive movement of the spring 11.

Mounted upon the casing 8 is another casing 16 containing a sealed air-drum 17 similar to the drum 5. The casing 16 also carries a spring 18 against which a projection on the drum 17 bears. Expansion and contraction of the drum 17 will cause movement of the spring 18. The interior of the casing 16 is provided with inlet and outlet pipes 19 and 20 respectively connecting it with the outer air.

The movement of the spring 18 is intended to vary the movement which the spring 11 imparts, through the magnifying mechanism, to the arm 14, and a convenient arrangement of apparatus for effecting this is illustrated in the accompanying drawings. Pivoted upon the extension 13 is a lever 21 slotted at its upper end to receive the end 22 of an arm 23 mounted upon a shaft 24. The shaft 24 is carried by a suitable pillar 25 mounted upon the casing 8. At one end the shaft 24 carries the arm 23 and at the other end it carries a double arm 26, 27, whereof the part 26 is connected by a spring 28 to the casing 8, and the part 27 carries the indicating or recording arm 14. The connection between the upper end of the lever 21 and the end of the arm 23 is loose or free and is capable of adjustment to bring the said point of connection nearer to or further from the shaft 24 with consequential variation of the amount of movement imparted to the shaft by the spring 11 through the lever 21. This adjusting movement of the lever 21 is effected by a jointed link 29 embracing the lever 21 at one end and carried by the spring 18 at the other end. In this way the drum 17 can through its spring 18 vary the amount of movement imparted to the arm 14 by the spring 11 of the air-speed diaphragm 7.

The upper edge 30 of the end 22 of the arm 23 which bears against the end of the slot in the lever 21 is curved concentrically about the pivoting point 31 of the lever 21. By this means variations in air-density will have no effect upon the arm 14 so long as the latter is at zero, since in this position the upper end of the lever 21 will simply ride over the end of the arm 23 without rotating the latter about its axis and consequently without interfering with the movement of the arm 14.

The arm 14 may either be used as an indicator in conjunction with a suitable scale, or as illustrated, may be provided with a marking point 32 to work in conjunction with a recording drum 33 rotated say by suitable clockwork or other mechanism part of which is indicated at 34.

The operation of the instrument will be apparent from the above description. The springs 11 and 28 balance each other and maintain the arm 14 in a state of equilibrium. Movement of the diaphragm 8, however, under influence of air pressure will cause movement of the spring 11 and thus of the arm 14, such movement being liable to compensatory correction by the drum 17 moving its spring 18. The air in the drum 17 will, before the latter is sealed, be at the same temperature as but at half the pressure of that for which the scale or drum with which the arm 14 co-operates is calibrated.

In order to prevent the arm 14 from carrying its marking point 32 off the drum 33 in certain conditions, a stop 36 may be fitted to the arm 14, but it will be appreciated that even in these conditions the lever 21, by reason of the size of the slot at its upper end, is still capable of rising independently of the arm 23. As illustrated, this stop 36 is in the form of a setscrew arranged to co-act with a bracket 37 mounted on the pillar 25.

The chambers 5 and 17 whether in the form of drums or tubes may be made of any suitable material: in some cases thin metal will be preferable.

I have found by experiment that the apparatus according to the present invention provides for correct or approximately correct air-speed readings being obtained whatever the altitude, temperature, or air-density may be, provided that the air chamber or drum is charged with air whose pressure, is half that of the pressure for which the air-speed indicator or recorder is calibrated. Where the air-density device is not to be used with an air-speed indicator, the pressure within the resilient air-chamber will of course be selected as half that of the atmosphere at the place where it is to be used and at, say, 60° F. The particular construction of magnifying mechanism illustrated may be modified in many respects without departing from the spirit and scope of the invention.

What I claim as my invention and desire to secure by Letters Patent is:—

1. A device operated by variations in air-density, comprising a resilient chamber adapted to move under variations of air pressure and thereby furnish pressure indications, in combination with magnifying means for magnifying the movements thereof, which chamber is charged with so much air as to superimpose a predetermined temperature correction upon the pressure indications to convert these into density indications.

2. A device operated by variations in air-density, for use in cooperation with a calibrated air-speed indicator, comprising a partially evacuated sealed drum of the aneroid-barometer type adapted to furnish pressure indications, in combination with magnifying indicating means operatively connected with the drum, which drum contains a charge of air at a pressure equal to half the pressure of the air for which the air-speed indicator is calibrated, whereby the pressure indications of the drum are converted into density indications.

3. In an air-speed indicator of the character described calibrated for a predetermined density of air, the combination with a diaphragm arranged to be actuated by air at different pressures at the two sides thereof, an indicating member, a mechanism comprising an adjustable member and a cooperating member connecting the diaphragm with the indicating member, said adjustable member being movable in relation to its cooperating member to vary the ratio of transmission of said mechanism, of an air density device having a member that is adapted to be moved in accordance with the varying density of the surrounding air, and is operatively connected with said adjustable member to move it in relation to its cooperating member to vary the ratio of transmission of said mechanism.

4. In an air-speed indicator of the character described, calibrated for a predetermined density of air; the combination with the diaphragm arranged to be actuated by air at different pressures at the two sides thereof, an indicating member and mechanism comprising an adjustable member and a cooperating member connecting the diaphragm with the indicating member, said adjustable member being movable in relation to its cooperating member to vary the ratio of transmission of said mechanism, of an air density device comprising a resilient chamber containing a charge of air at approximately half said predetermined density and means operatively connecting the chamber with the adjustable member to move it in relation to its said cooperating member to vary the ratio of transmission of said mechanism in accordance with the movements of said chamber.

5. In an air-speed indicator of the character described, calibrated for a predetermined density of air the combination with a diaphragm arranged to be actuated by air at different pressures at the two sides thereof, an indicating member, a mechanism comprising an adjustable member and a cooperating member operatively connecting the diaphragm with the indicating member, said adjustable member being movable in relation to its cooperating member to vary the ratio of transmission of said mechanism, of an air density device comprising a resilient chamber containing a charge of air at half the said predetermined density, and magnifying means operatively connecting said chamber to the adjustable member to move it in relation to its cooperating member to vary the ratio of transmission of said mechanism in accordance with the movements of said chamber.

6. In an air-speed indicator of the character described, calibrated for a predetermined density of air, the combination with a diaphragm arranged to be actuated by air at different pressures at the two sides thereof, an indicating member and a cooperating member operatively connecting the diaphragm with the indicating member, said adjustable member being movable relatively to its cooperating member to vary the ratio of transmission of said mechanism, of an air density device comprising a sealed drum of the aneroid-barometer type containing a charge of air at the same temperature, but at half the pressure of the air of predetermined density, and means operatively connecting the drum with said adjustable member to move it in relation to its cooperating member to vary the movements of said mechanism in accordance with the movements of the drum.

7. In an air-speed indicator of the character described calibrated for a predetermined density of air, the combination with a diaphragm arranged to be actuated by air at different pressures at the two sides thereof, of an indicating member, movable means comprising an adjustable member operatively connecting the diaphragm with the indicating member and arranged to have its ratio of movement changed without moving the indicator when it is at zero, and an air-density device comprising a sealed drum of the aneroid barometer type containing a charge of air at half said predetermined density, and means operatively connecting said drum with said adjustable member to vary the ratio of transmission of said movable means.

8. In an air-speed indicator of the character described calibrated for a predetermined density of air, the combination of a diaphragm arranged to be actuated by air at different pressures at the two sides thereof, an indicating member, lever mechanism comprising a lever-arm operatively connected with the indicating member, and a rod that is pivotally operatively connected with said diaphragm and is adjustably connected with said lever-arm to vary the ratio of transmission of the lever mechanism, an air-density device having a resilient chamber charged with air at half said predetermined density, and means operatively connecting said chamber with said rod to vary the ratio of transmission of the lever mechanism.

9. In an air-speed indicator of the character described calibrated for a predetermined density of air, the combination of a diaphragm arranged to be actuated by air at different pressures at the two sides thereof, an indicating member, an air-density device having a resilient chamber charged with air at half said predetermined density, a magnifying member arranged to be actuated by said diaphragm a rod having one end pivotally operatively connected with said magnifying member, a lever-arm operatively connected with said indicating member and having an operative face that is curved in the arc of a circle about the pivot of said rod, and movably carries the other end of said rod, and means operatively conecting said chamber with said rod to shift the same relatively to said arm and thereby vary the ratio of transmission of the lever mechanism.

10. A device adapted to be used for indicating varying degrees of air density, and for use in co-operation with a calibrated air-speed indicator of the pressure-diaphragm type, comprising in combination a resilient chamber containing a charge of air at the same temperature as, but at half the pressure of the air for which the air-speed indicator is calibrated, magnifying indicating mechanism operatively connected with the chamber, and a casing having an inlet and an outlet for air surrounding said chamber, for the purpose specified.

11. A compensated air-speed recorder calibrated for a predetermined density of air, comprising in combination a casing having a diaphragm stretched across the same and having an inlet and an outlet opening into the casing at opposite sides of the diaphragm, a recording drum mounted on the casing, an air-density device comprising a housing having an inlet and an outlet mounted on the casing, a sealed drum containing a charge of air at half said predetermined density supported in said housing, and a magnifying member operatively connected with said sealed drum, a rock shaft mounted on said casing and carrying an indicating arm arranged to move in operative relation to said recording drum, a spring arranged to control said indicating arm, an operating arm fast on said rock-shaft, a magnifying member mounted on said casing and arranged to be actuated by said diaphragm, a rod having one end pivoted to the latter magnifying member and its other end arranged to move along said operating arm, and a link connecting said rod with said former magnifying member.

In testimony whereof I affix my signature.

GEORGE CUTHBERT SHERRIN.